(12) United States Patent
Scarbrough

(10) Patent No.: US 7,609,451 B1
(45) Date of Patent: Oct. 27, 2009

(54) PRINTED ARTICLE FOR DISPLAYING IMAGES HAVING IMPROVED DEFINITION AND DEPTH

(75) Inventor: Joel Scott Scarbrough, Lindenhurst, IL (US)

(73) Assignee: Serigraph, Inc., West Bend, WI (US)

( * ) Notice: Subject to any disclaimer, the term of this patent is extended or adjusted under 35 U.S.C. 154(b) by 0 days.

(21) Appl. No.: 12/026,069

(22) Filed: Feb. 5, 2008

(51) Int. Cl.
*G02B 27/10* (2006.01)

(52) U.S. Cl. ...................... 359/619; 359/626

(58) Field of Classification Search ......... 359/619–620, 359/625–626
See application file for complete search history.

(56) References Cited

U.S. PATENT DOCUMENTS

| | | | |
|---|---|---|---|
| 4,588,899 A | 5/1986 | Erhardt |
| 4,920,039 A | 4/1990 | Fotland et al. |
| 5,276,478 A | 1/1994 | Morton |
| 5,460,679 A | 10/1995 | Abdel-Kader |
| 5,642,226 A | 6/1997 | Rosenthal |
| 5,644,431 A | 7/1997 | Magee |
| 5,680,734 A | 10/1997 | Magee |
| 5,699,190 A | 12/1997 | Young et al. |
| 5,712,731 A | 1/1998 | Drinkwater et al. |
| 5,753,344 A | 5/1998 | Jacobsen |
| 5,800,907 A | 9/1998 | Yumoto |
| 5,933,084 A | 8/1999 | Ravier et al. |
| 6,043,481 A | 3/2000 | Tan et al. |
| 6,084,713 A | 7/2000 | Rosenthal |
| 6,091,479 A | 7/2000 | Frosig et al. |
| 6,101,039 A | 8/2000 | Blazey |
| 6,110,652 A | 8/2000 | Stork et al. |
| 6,113,149 A | 9/2000 | Dukatz |
| 6,170,881 B1 | 1/2001 | Salmon et al. |
| 6,185,892 B1 | 2/2001 | Calvanella |
| 6,256,150 B1 | 7/2001 | Rosenthal |
| 6,277,232 B1 | 8/2001 | Wang et al. |
| 6,353,500 B1 | 3/2002 | Guigan et al. |

(Continued)

FOREIGN PATENT DOCUMENTS

AU        2006100412 A4      6/2006

(Continued)

OTHER PUBLICATIONS

International Search Report for corresponding International Application No. PCT/US2009/033179, having a mailing date of Apr. 3, 2009.

*Primary Examiner*—Scott J Sugarman
*Assistant Examiner*—Dawayne A Pinkney
(74) *Attorney, Agent, or Firm*—Andrus, Sceales, Starke & Sawall, LLP

(57) ABSTRACT

Disclosed are printed articles and methods for manufacturing printed articles. The printed articles typically include: (a) a substrate having a top surface and a bottom surface; (b) a graphic image layer comprising a plurality of images printed on at least one surface of the substrate; and (c) a plurality of polygonal lenses printed or formed on at least one surface of the substrate above the graphic image layer, wherein the polygonal lenses are clear, magnifying, convex lenses. The lenses may selectively magnify portions of the array of images to create a plurality of images that appear and disappear or images that float under or on top of the graphic image when viewed from different perspectives.

7 Claims, 9 Drawing Sheets

U.S. PATENT DOCUMENTS

| | | |
|---|---|---|
| 6,831,787 B1 | 12/2004 | Scarbrough et al. |
| 6,833,960 B1 | 12/2004 | Scarbrough et al. |
| 6,856,462 B1 | 2/2005 | Scarbrough et al. |
| 6,979,487 B2 | 12/2005 | Scarbrough et al. |
| 7,048,307 B1 | 5/2006 | Scarbrough et al. |
| 7,075,725 B2 | 7/2006 | Tomczyk |
| 2003/0227688 A1 | 12/2003 | Houlihan et al. |
| 2005/0180020 A1* | 8/2005 | Steenblik et al. ............ 359/626 |
| 2006/0262411 A1 | 11/2006 | Dunn et al. |
| 2007/0058260 A1 | 3/2007 | Steenblik et al. |

FOREIGN PATENT DOCUMENTS

| | | |
|---|---|---|
| JP | 6334925 | 12/1994 |
| WO | WO-91/02270 | 2/1991 |

* cited by examiner

PRINTED ARTICLE FOR DISPLAYING IMAGES HAVING IMPROVED DEFINITION AND DEPTH

BACKGROUND

The invention relates to printed articles that display images, which may include composite images. The printed articles may include secure credit cards, trading cards, greeting cards, signs, posters, labels, decals, book covers, decorative panels, name plates, visual displays and the like. The printed articles may display or project a composite image magnified by a plurality of clear geometric lenses printed or formed above a patterned graphic design. The composite image may embody visual illusions of depth, three-dimensionality, hidden images or motion. The composite image may provide the printed article with identifiable features which cannot be easily copied (e.g., holographic images, hidden images, and the like).

In order to attract the attention of consumers, many products are manufactured with images that provide a unique and sensational visual presentation. To meet this demand, a variety of printing techniques have been developed to produce aesthetically pleasing visual effects, such as the appearance of depth, three-dimensionality and motion. In addition, various methods are known in the prior art that produce hidden or latent images or three-dimensional images on two-dimensional media. The hidden or latent image may become apparent only upon viewing the two-dimensional media from an angle.

In addition, the use of hidden or latent images or three dimensional images may be useful to prevent counterfeiting, where the images cannot be copies by conventional methods. The only way to duplicate the appearance and floating or hidden image effect is to recreate the actual printed article, including the embodied graphical and optical layers.

One method for creating three-dimensional images involves printing two offset images in different colors on an opaque or transparent sheet, and viewing the images using special glasses having right and left lenses which correspond to the different image colors respectively. This method is limited in that to see the visual effect the viewer must observe the image typically through special glasses.

Another method to achieve a three-dimensional or animated visual presentation is through the use of a lenticular or lens-array imaging systems. In these systems, an array of parallel convex lenses is formed over a clear plastic substrate, where the parallel lenses magnify portions of images printed under them. By viewing the substrate from different angles, a view observes different focused portions of the underlying images such that an overall image or pattern is seen at one viewing angle and a different image is visible at another viewing angle. This can result in a number of visible effects such as a three-dimensional image, a simple image A to image B flip (or transversion), or multiple images that show a series of images from one viewing angle to another resulting in the appearance of viewing a motion video clip. Despite the variety of possible effects, these systems have had limited success because manufacturing expenses and material costs are very high. Systems of the prior art also are limited in that they may utilize a prefabricated sheet of lenses, rather than lenses that are directly printed on a selected portion of a graphic image.

U.S. Pat. Nos. 6,856,462 and 6,833,960 describe lenticular imaging systems (hereinafter referred to as the '462 and '960 patents, respectively). Both the '462 and '960 patent describe printing or forming an array of lenses comprising a plurality of linear or circular shapes when viewed from a top planar perspective. However, the lenticular systems disclosed in the '462 and '960 patent are limited in that they use linear or circular shaped lens. The clarity of a composite image produced from an array will be proportional to the amount of magnifying lens material in the array versus non-magnifying space between the magnifying lens material. Therefore, it is desirable that the lenses within an array are packed as closely as possible. The permitted proximity of the lenses, however, will be limited because of "flooding" which may occur after a lens array is printed and prior to curing. "Flooding" occurs when the surface tension of the printed lenses is not sufficient to prevent a lens from merging with one or more adjacent lenses prior to curing. "Flooding" destroys the uniformity of an array. Accordingly, lenses must be positioned in an array to include a space between adjacent lenses to avoid flooding. The geometry and positioning of the lenses in the disclosed articles should be selected to maximize the percent area of magnifying lenses and minimize non-magnifying areas within a plurality of lenses in view of this space between lenses.

In addition, it is desirable to maximize the height (or thickness) of lenses in an array in order to maximize magnification. The permitted height of the lenses also will be limited because of "flooding" where the surface tension of the liquid used to form the lenses will not permit lenses of excessive height without flooding occurring. Therefore, the geometry and positioning of the lenses in the disclosed articles also should be selected to maximize the permitted height of the lenses.

Linear and circular shaped lenses do not achieve these stated goals. Linear lenses have limited use in lenticular systems because they focus only in a linear direction and present additional difficulties with respect to obtaining desirable lens height. Circular shaped lenses are disadvantageous in that their curved shape does not permit the closest possible packing arrangement within a lens array further in view of avoiding "flooding."

U.S. Pat. No. 5,800,907 discloses a lens body or article with lenses that is produced by forming "lens-forming defining lines" on the surface of a substrate. The "lens-forming defining lines" are used to create a patterned grid on the surface of a substrate and a lens-forming resin then is applied to the patterned grid. The lens-forming resin is insoluble in the material used to create the "lens-forming defining lines" and forms lenses within the spaces of the patterned grid after the patterned grid is coated with the lens-forming resin. As such, the '907 patent does not disclose that lenses can be directly applied or printed on an image (or micropattern image) on a surface of the substrate. Furthermore, the "lens-forming defining lines" of the '907 patent add complexity and cost to methods of manufacturing the disclosed articles.

The present invention achieves these goals and overcomes these limitations in the prior art by utilizing transparent polygonal lenses that are applied or printed on an image (or micropattern image) on the surface of the substrate. Printed articles and lenticular imaging utilizing the transparent polygonal lenses display images having improved definition and depth.

Reference to any prior art in the specification is not, and should not be taken as, an acknowledgement or any form of suggestion that this prior art forms part of the common general knowledge in any jurisdiction or that this prior art could reasonably be expected to be ascertained, understood and regarded as relevant by a person of ordinary skill in the art.

SUMMARY

Disclosed are articles that include graphic images and polygonal lens for displaying the graphic images. The polygonal lenses are clear, magnifying lenses that may project a composite image formed from the graphic images.

In some embodiments, the disclosed articles include printed articles and lenticular imaging systems. The articles may include: (a) a substrate having a top surface and a bottom surface; (b) a graphic image layer comprising an image printed on at least one surface of the substrate; and (c) a plurality of polygonal lenses formed or printed on at least one surface of the substrate above the graphic image layer (e.g., polygonal lenses which are clear, magnifying, convex lenses). The graphic image layer may include a graphic image and a separate micro-pattern image, which may comprise a plurality of repeated images in an array or matrix. The article may include a clear layer formed or printed over the graphic image layer on which the plurality of polygonal lenses are formed or printed. In some embodiments, each of the plurality of polygonal lenses is individually formed or printed on the graphic image layer or the clear layer.

The plurality of polygonal lenses may be organized as an array or matrix that corresponds to the plurality of repeated images of the micro-pattern image. The plurality of polygonal lenses may create a composite image formed by magnifying portions of the plurality of repeated images. In some embodiments, the array or matrix of images typically includes parallel rows of repeated images and the array or matrix of polygonal lenses typically includes parallel rows of lenses, where the frequency of the repeated images is different than the frequency of lenses.

In preferred embodiments, the polygonal lenses are selected from hexagonal lenses and tetragonal lenses (e.g., square lenses, rectangle lenses, rhombus lenses or diamond-shaped lenses). Most preferably, the polygonal lenses include hexagonal lenses. The lenses may be formed or printed on the substrate using methods that may include printing, embossing, impressing, and stamping. In some embodiments, the lenses are printed directly on the graphic image layer. In other embodiments, a clear layer is present above the graphic image layer and the lenses are formed or printed directly on the clear layer.

In some embodiments, the lenses may be semi-circular in cross-section or crescent-shaped in cross-section. In other embodiments, the lenses may be substantially flat in cross-section. For example, the lenses may have a top face that is substantially parallel to a surface of the substrate for at least about 50% of the surface area of the top face.

The disclosed articles typically include a graphic image layer. The graphic image layer may be printed on the top surface, bottom surface, or both surfaces of the substrate. In some embodiments the graphic image layer comprises an array or matrix of images which may include a micro-pattern image. The array or matrix may include an orderly arrangement of a repeated graphic image in one or more planes. The images of the array may be evenly spaced in one or more planes (e.g., horizontally and/or vertically).

The disclosed articles typically include a plurality of polygonal lenses which may be organized as an array or matrix and may include a micro-pattern of lenses. The lenses of an array may be evenly spaced in one or more planes (e.g., horizontally and/or vertically). In some embodiments, an array of polygonal lenses may be oriented above an array of images such that each lens magnifies a portion of an image to display at least one composite image which is formed from each magnified portion of the image. In some embodiments, the composite image is displayed above the top surface of the substrate. In other embodiments, the composite image is displayed below the top surface of the substrate. In further embodiments, the disclosed articles may display different images when the articles are viewed from different angles. The different images may include differently colored images. The array of lenses may have a frequency (i.e., lens per vertical and/or horizontal distance) that is the same or different than a frequency for an array of images (i.e., image per vertical and/or horizontal distance).

In some embodiments, the disclosed articles include an array of lenses as an orderly arrangement, where a lens is present at a selected frequency in the array. For example, the array of lenses may include a number of evenly spaced lenses per linear distance in one or more planes (e.g., 100 lenses per linear inch, horizontally and/or vertically). Furthermore, the disclosed articles may include an array of images may as an orderly arrangement of images occurring at a selected frequency. For example, the array of images may include a number of evenly spaced images per linear distance in one or more planes (e.g., about 100 images per linear inch, horizontally and/or vertically providing a "micro-pattern" of images). In some embodiments, the frequency of lenses differs from the frequency of images. For example, the frequency of lenses may be less than or greater than the frequency of images. In other embodiments, the frequency of lenses is the same as the frequency of images (which may be preferable where differently colored images are displayed by the article when viewed from different angles).

The articles may include additional components. For example, the articles further may include a transparent layer formed on at least one surface of the substrate (e.g., on a surface above the graphic image layer).

The disclosed articles may include a second graphic image layer on at least one surface of the substrate. For example, the second graphic image layer may comprise a second graphic image (e.g., a macro-image) or second array of images (e.g., a second micro-pattern image) in addition to the first array of images present in the first graphic image layer. The array of lenses may or may not be formed over the second graphic image layer. The array of lenses may have a frequency that is less than, the same as, or greater than a frequency for a second array of images present in a second graphic image layer.

The substrate of the disclosed articles may be opaque, translucent, semi-transparent, or fully transparent. Optionally, the substrate includes a clear or fully transparent layer formed over a graphic image layer.

Also disclosed are lenticular imaging systems. The system may include: (a) a substrate having a top surface and a bottom surface; (b) a graphic image layer comprising a plurality of images formed on at least one surface of the substrate; and (c) a plurality of polygonal lenses formed on at least one surface of the substrate above the graphic image layer, wherein the polygonal lenses are clear, magnifying, convex lenses that are oriented above the plurality of images such that each lens magnifies a portion of an image to display at least one composite image. Pluralities of images may include arrays or matrices of images. Pluralities of lenses may include arrays or matrices of lenses. The images and lenses may be formed using methods that may include printing, embossing, impressing, and stamping.

Also disclosed are methods of forming the disclosed articles. In some embodiments, the methods of forming the disclosed articles comprise: (a) printing a graphic image layer comprising an array or matrix of images on at least one surface of a substrate; optionally, forming a clear or fully transparent layer over the graphic image layer; and (b) forming or printing an array or matrix of polygonal lenses on at least one surface of the substrate above the graphic image layer, wherein the polygonal lenses are clear, magnifying, convex lenses. The article may include polygonal lenses selected from the group consisting of hexagonal lenses, square-shaped lenses, rectangle-shaped lenses, and rhombus-shaped lenses (preferably hexagonal lenses). The polygonal lenses may be semi-circular, crescent-shaped, or substantially flat in cross-section. Typically, the methods produce an article where the array or matrix of polygonal lenses are oriented above the array or matrix of images such that each lens magnifies a portion of an image to display at least one composite image as disclosed herein.

DETAILED DESCRIPTION

The subject matter disclosed herein is described using several definitions, as set forth below and throughout the application.

Unless otherwise noted, the terms used herein are to be understood according to conventional usage by those of ordinary skill in the relevant art. In addition to the definitions of terms provided below, it is to be understood that as used in the specification, embodiments, and claims, "a" or "an" can mean one or more, depending upon the context in which it is used.

As used herein, "about", "approximately," and "significantly" will be understood by persons of ordinary skill in the art and will vary to some extent on the context in which they are used. If there are uses of the term which are not clear to persons of ordinary skill in the art given the context in which it is used, "about" and "approximately" will mean up to plus or minus 10% of the particular term and "significantly" will mean more than plus or minus 10% of the particular term.

As used herein, a "polygon" is a plane figure bounded by three or more straight line segments or "sides," where the sides are joined at three or more corners and the number of corners corresponds to the number of sides. As such, a "polygonal" shape is a multi-sided, closed planar shape. Polygons may include trigons (or triangles), tetragons (or quadrilaterals), pentagons, hexagons, heptagons, octagons, and the like. Tetragons may include squares and rectangles, which have four sides connected at four right angles. Tetragons also may include rhombi (e.g., diamond-shaped polygons or parallelograms), which do not include four right angles. As used herein, a "polygon" does not include a circular shape (i.e., a dot) or an elongated circular shape, such as an oval shape or a tubular shape.

In cross-section, the lenses disclosed herein may be semi-circular, crescent-shaped, or substantially flat. (See FIG. 10). A lens that is "substantially flat" in cross-section may have a top face where at least 50% of the surface of the top face is approximately parallel to the surface of the substrate. The lens may include curvature at the remaining surface of the top face from the approximately flat portion to the point where the top face contacts the surface of the substrate (i.e., curvature along the periphery of the lens). The substantially flat surface of the lenses prevents magnification of the pattern image when viewed from a top planar perspective. The curvature along the periphery of the lens creates magnification of an underlying pattern image only when the pattern image is viewed from a substantially non-planar perspective. Thus when the printed article is viewed from the top planar perspective, no composite image is seen and when the viewing angle is changed to a substantially non-planar view, a hidden image comprising magnified portions of the pattern image is revealed.

Figure 4:
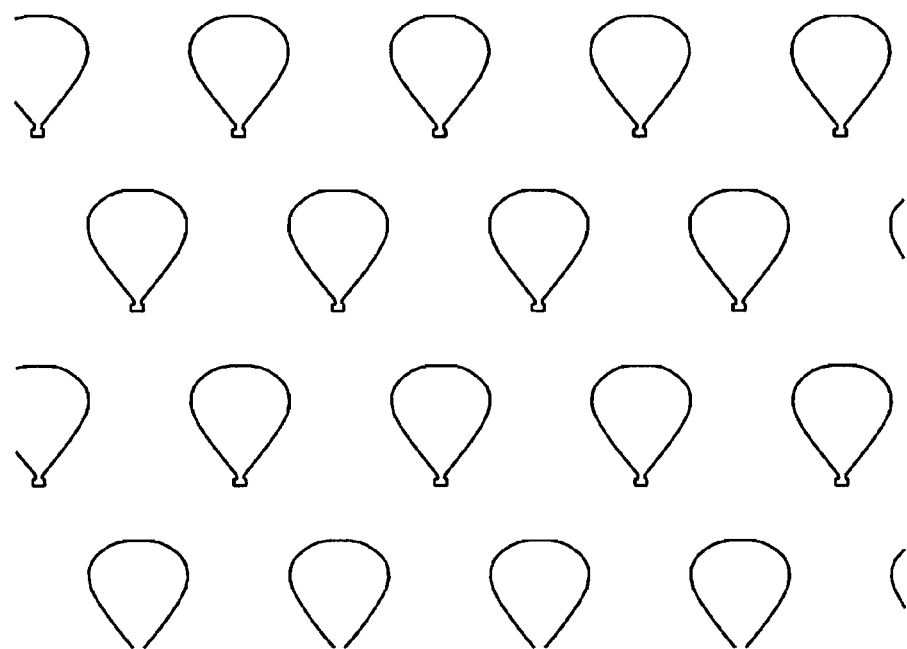
FIG. 4 is a highly magnified top plan view of a micro-pattern image produced in accordance with the present invention.
Figure 5:
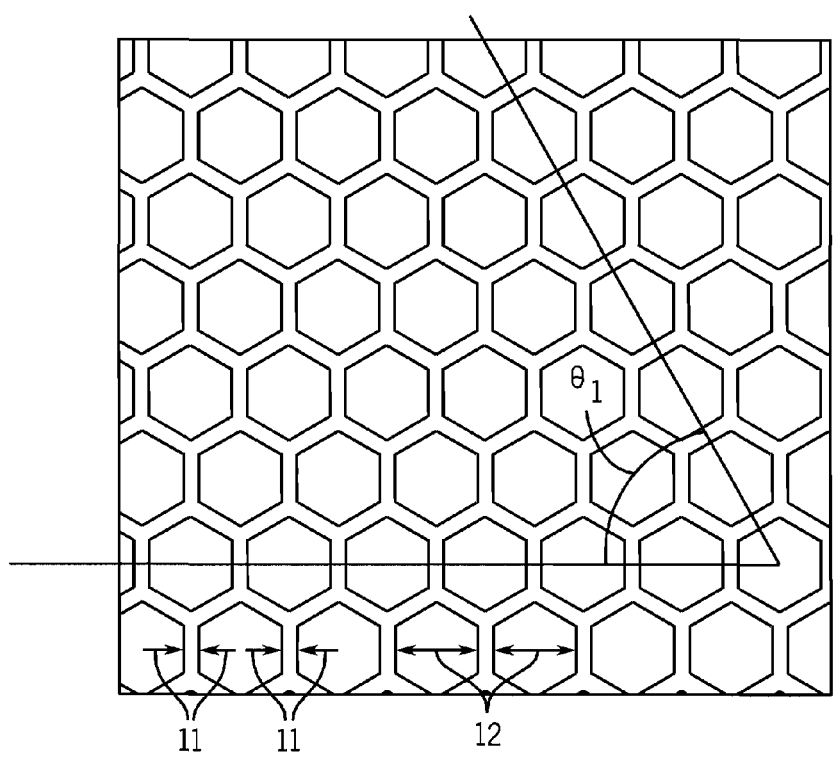
FIG. 5 is a highly magnified top plan view of transparent hexagonal lenses produced in accordance with the present invention.

The disclosed articles typically include a plurality of images, which may be organized as an array or matrix of images and may be a micro-pattern image. In some embodiments, the images may be arrayed in offset parallel lines. (See, e.g., FIG. 4, showing an array of balloon images arranged in parallel lines that are horizontally offset by 50%). The disclosed articles also typically include a plurality of polygonal lenses, which may be organized as an array or matrix of lenses and may be arrayed in offset parallel lines. (See, e.g., FIG. 5, showing an array of hexagonal lenses arranged in parallel lines that are horizontally offset by 50%).

The frequency of lenses in an array may be less than, the same as, or greater than the frequency of images in an array. In some embodiments, the lenses may display a composite image above or below the surface of the graphic image layer. In further embodiments, the lenses may display different images when the article is viewed from different angles or differently colored images when the article is viewed from different angles.

In some embodiments of the disclosed articles, each lens in an array may magnify a portion of an image within an array of images such that a composite image is formed from the magnified portions. The magnified image may appear as a three dimensional image that floats above or below the surface of the substrate. In order to magnify portions of the image within the array of images, typically the array of lenses has a frequency that is different than the frequency of the images within the array of images. As used herein, "frequency" may refer to the number of images occurring within a linear length of the array of images. Similarly, "frequency" may refer to the number of lenses occurring within a linear length of the array of lenses. For example, an array of images may include about 100 images per linear inch (horizontally, vertically, or in both directions). Similarly, an array of lenses may include about 100 lenses per linear inch (horizontally, vertically, or in both directions). However, in order to create a composite image, typically the frequency for the array of images will differ from the frequency of the array of lenses. This results in each lens of the array being "offset" with respect to each image of the array. Where the frequency of images is less than the frequency of lenses (e.g., 99 per inch versus 100 per inch, respectively), the composite image will appear to float above the surface of the substrate. Where the frequency of images is greater than the frequency of lenses, the image will be inverted and will appear to float behind the surface of the substrate. In some embodiments, suitable frequencies for the arrays of images and lenses may include 96, 97, 98, 99, 100, 101, 102, 103, or 104 images or lenses per inch, where the frequency for the array of images and the frequency for the array of lenses may be the same or different.

The graphic images and lens may be applied to a substrate by any suitable method. For example, in some embodiments the graphic images and lens may be applied using methods that include printing, embossing, impressing, stamping, or a combination thereof. The graphic images may be applied using one selected method (e.g., printing) and the lens may be applied using the same or different method (e.g., embossing). Printing methods may include lithography, flexography, silk screening and the like.

The disclosed articles may include additional components, which, for example may be printed, embossed, impressed, or stamped on the articles. In some embodiments, the disclosed articles may include a printed article comprising a substrate having a top surface printed with a micro-pattern image and optionally including an additional graphic image. The additional graphic image may include a second pattern of images (e.g., a second micro-pattern image) or may include one or more non-pattern images (e.g., a macro-image). Optionally, a clear or fully transparent layer may be formed or printed over the printed micro-pattern image (and over the additional graphic image and second pattern of images, where present). Over these images is formed or printed a plurality of transparent polygonal lenses wherein the plurality of transparent polygonal lenses is positioned above the micro-pattern image(s) and optionally the additional graphic image. The frequency of images in the micro-pattern image(s) and the frequency of transparent polygonal lenses in the plurality of lenses may be selected such that each individual transparent lens magnifies a portion of an image in the first micro-pattern image and optionally the second micro-pattern image, where the additional graphic image includes a second micro-pattern image. When viewed from a top planar view, the plurality of transparent lenses may display a composite image formed from the magnified portions of the first micro-pattern image, and optionally the second micro-pattern image. The composite image or images may be different and may appear to float above or below the surface of the substrate. In some embodiments, the additional graphic image may comprise a second micro-pattern image that has a frequency which differs from the frequency of the first micro-pattern image. In further embodiments, the lenses may display multiple, different images when the article is viewed from different angles. The multiple, different images may include differently colored images and/or differently shaped images.

The present invention overcomes limitations in the prior art by utilization of transparent polygonal lenses. The disclosed polygonal lenses may be used to maximize the density of magnifying material in an array of lenses. In addition, printing heretofore thicker transparent lenses of parallel lines can now be compensated by eliminating angles of parallel rows of lenses running perpendicular to the output device printing direction, and or digitally adjusting the thickness and spacing of parallel rows of lenses that will be output at directions perpendicular to the output printing device. Selecting angles for the plurality of transparent polygonal lenses to avoid flooding or flowing together of the transparent lenses may ensure that the printed article has a sharp and clear image. By controlling the angles of the plurality of transparent polygonal lenses, the height and/or thickness of the lenses can be increased without flooding occurring. In addition, for the same comparative lens height and thickness, the distance between the lenses may also be decreased while minimizing the risk of ink from adjacent lenses flooding or bleeding into each other. This increases the visual illusion of three-dimensionality by increasing the concentration in a given area of magnifying lenses versus non-magnifying space between the transparent polygonal lenses.

In addition, certain geometric shapes have been discovered that can be printed closer together without flooding. Lines and dots can only be printed far enough apart such that surface tension and mechanical shear forces from the printing processes do not cause flooding together of the transparent lenses. Typically, printing circular dots of transparent ink require thirty to forty percent space of "non-dot" lens area between the lenses to prevent the dots from flooding together when printing. This results in thirty to forty percent non-magnifying area in the printed article. Creating and printing the lenses in certain geometric shapes, such as hexagons, allow the same spacing as circular dot lenses while resisting attractive surface tension forces which would cause circular dot lenses to flood together. In addition, printing hexagonal lenses effectively reduces the non-magnifying area from thirty to forty percent down to fifteen to twenty percent non-magnifying area, where hexagons lenses can be packed with less "non-lens" space than circular dot lenses. This results in clearer three dimensional effects when an underlying micro-pattern image is magnified by a corresponding array of hexagonal lenses.

It has also been observed that the angles of the rows of transparent lenses and the geometric shapes of the lenses themselves are susceptible to errors imparted from the relative direction of printing, of shear, of squeegee movement, of the etching of anilox or gravure rolls; film output errors; digital raster image processing errors, and error resulting from surface tension forces. Specific geometric shapes and angles for the parallel rows of transparent lenses may be selected based on minimizing and compensating for these errors to achieve heretofore unachievable lens height and close packing together of the transparent lenses, avoiding bleeding, flooding, and flow of the transparent texture ink.

ILLUSTRATIVE EMBODIMENTS

The following embodiments are illustrative and are not intended to limit the scope of the claimed subject matter.

Embodiment 1

A printed article comprising: (a) a substrate having a top surface; (b) a graphic image formed over the top surface of said substrate; (c) a micro-pattern image formed over the top surface of said substrate; and (d) a plurality of clear geometric lenses formed over the surface of the graphic image, wherein said plurality of clear geometric lenses are positioned above said graphic image and said micro-pattern image, wherein said clear geometric lenses are semi-circular in cross-section and in a top planar view are comprised of hexagons, circles, diamonds, squares, or rectangles, and said plurality of clear geometric lenses are oriented above said micro-pattern image such that each individual clear geometric lens magnifies a portion of said micro-pattern image such that the plurality of clear geometric lenses magnify and combine multiple portions of said micro-pattern to display a composite image which when viewed from different directions is displayed on different portions of said printed article.

Embodiment 2

A printed article comprising: (a) a substrate having a top surface; (b) a graphic image formed over the top surface of said substrate; (c) a micro-pattern image formed over the top surface of said substrate; (d) a transparent layer formed over the top surface of said pattern image; and (e) a plurality of clear geometric lenses formed over the surface of the graphic image, wherein said plurality of clear geometric lenses are positioned above said graphic image and said micro-pattern image, wherein said clear geometric lenses are semi-circular in cross-section and in a top planar view are comprised of hexagons, circles, diamonds, squares, or rectangles, and said plurality of clear geometric lenses are oriented above said micro-pattern image such that each individual clear geometric lens magnifies a portion of said micro-pattern image such that the plurality of clear geometric lenses combine multiple portions of said micro-pattern to display a composite image which when viewed from different directions is displayed on different portions of said printed article.

Embodiment 3

A printed article comprising: (a) a transparent substrate having a rear and front surface; (b) a micro-pattern image first formed over the rear surface of said substrate; and (c) a plurality of clear geometric lenses printed over the surface of the graphic image, wherein said plurality of clear geometric lenses are positioned above said graphic image and said micro-pattern image, wherein said clear geometric lenses are semi-circular in cross-section and in a top planar view are comprised of hexagons, circles, diamonds, squares, or rectangles, and said plurality of clear geometric lenses are oriented above said micro-pattern image such that each individual clear geometric lens magnifies a portion of said micro-pattern image such that the plurality of clear geometric lenses combine multiple portions of said micro-pattern to display a composite image which when viewed from different directions is displayed on different portions of said printed article.

Embodiment 4

A printed article as in embodiments 1-3 where said clear geometric lenses, when viewed in cross-section, are substantially planar for the majority of the surface of said clear geometric lens and substantially curved around the circumference of the geometric shape, such that said micro-pattern image printed under the clear geometric lenses are not magnified when viewed from a top planar perspective, yet when viewed from angles substantially not a top planar perspective, the circumferential curvature of said clear geometric lenses does magnify said micro-pattern image to reveal a hidden image.

Embodiment 5

A method of forming a printed article, the method including the steps of (a) providing a substrate having a top surface; (b) forming a graphic image over the top surface of said substrate; (c) forming a micro-pattern image over the top surface of said substrate; (d) forming a textured pattern of a plurality of clear geometric lenses formed over the surface of the graphic image; and (e) forming said clear geometric lenses as to be semi-circular in cross-section and comprised of hexagons, circles, diamonds, squares, or rectangles when viewed from a top planar view; (f) positioning said plurality of clear geometric lenses above said graphic image and said micro-pattern image; and (g) orienting said plurality of clear geometric lenses above said micro-pattern image such that each individual clear geometric lens magnifies a portion of said micro-pattern image such that the plurality of clear geometric lenses combine multiple portions of said micro-pattern to display a composite image which when viewed from different directions said composite image is displayed on different portions of said printed article.

Embodiment 6

A method of forming a printed article, the method including the steps of (a) providing a substrate having a top surface; (b) forming a graphic image over the top surface of said substrate; (c) forming a micro-pattern image over the top surface of said substrate; (d) applying a transparent layer over the top surface of said pattern image; (e) forming a textured pattern of a plurality of clear geometric lenses formed over the surface of the graphic image; (f) forming said clear geometric lenses as to be semi-circular in cross-section and comprised of hexagons, circles, diamonds, squares, or rectangles when viewed from a top planar view; (g) positioning said plurality of clear geometric lenses above said graphic image and said micro-pattern image; and (h) orienting said plurality of clear geometric lenses above said micro-pattern image such that each individual clear geometric lens magnifies a portion of said micro-pattern such that the plurality of clear geometric lenses combine multiple portions of said micro-pattern to display a composite image which when viewed from different directions, said composite image is displayed on different portions of said printed article.

Embodiment 7

A method of forming a printed article, the method including the steps of (a) providing a transparent substrate having a rear and front surface; (b) forming a graphic image over the rear surface of said transparent substrate; (c) forming a micro-pattern image over the rear surface of said substrate; and (d) forming a textured pattern of a plurality of clear geometric lenses printed over the front surface of the transparent substrate; (e) forming said clear geometric lenses as to be semi-circular in cross-section and comprised of hexagons, circles, diamonds, squares, or rectangles when viewed from a top planar view; (f) positioning said plurality of clear geometric lenses above said graphic image and said micro-pattern image; and (g) orienting said plurality of clear geometric lenses above said micro-pattern image such that each individual clear geometric lens magnifies a portion of said micro-pattern such that the plurality of clear geometric lenses combine multiple portions of said micro-pattern to display a composite image which when viewed from different directions, said composite image is displayed on different portions of said printed article.

Embodiment 8

A method of forming a printed article as in any of embodiments 4-7 where the clear geometric lenses are formed to be substantially planar for the majority of the surface of the clear geometric lens and substantially curved around the circumference of the geometric shape when viewed in cross-section, and the methods further comprise forming a micro-pattern image under said clear geometric lenses that are not magnified when viewed from a top planar perspective and; forming a circumferential curvature of said clear geometric lenses to magnify said micro-pattern image to reveal a hidden image when viewed from angles substantially not from a top planar perspective.

Embodiment 9

A printed article comprising: (a) a substrate having a top surface and a bottom surface; (b) a graphic image layer comprising a plurality of images printed on at least one surface of the substrate; and (c) a plurality of polygonal lenses printed on at least one surface of the substrate above the graphic image layer, wherein the polygonal lenses are clear, magnifying, convex lenses.

Embodiment 10

The printed article of embodiment 9, wherein the plurality of polygonal lenses comprises polygonal lenses selected from the group consisting of hexagon lenses, square lenses, rectangle lenses, and rhombus lenses.

Embodiment 11

The printed article of embodiment 10, wherein the polygonal lenses comprise hexagon lenses.

Embodiment 12

The printed article of any of embodiments 9-11, wherein the polygonal lenses are semi-circular in cross-section.

Embodiment 13

The printed article of any of embodiments 9-12, wherein the polygonal lenses are substantially flat in cross-section.

Embodiment 14

The printed article of any of embodiments 9-13, wherein the plurality of images comprises a micro-pattern image.

Embodiment 15

The printed article of any of embodiments 9-14, wherein the plurality of polygonal lenses are oriented above the plurality of images such that each lens magnifies a portion of an image to display at least one composite image.

Embodiment 16

The printed article of any of embodiments 9-15, wherein the plurality of lenses are individually printed on the substrate.

Embodiment 17

The printed article of any of embodiments 9-16, wherein the plurality of images comprises an array of images and the plurality of lenses comprises an array of lenses.

Embodiment 18

The printed article of embodiment 17, wherein: the array of lenses has a frequency of lenses; the array of images has a frequency of images; and the frequency of lenses is greater than the frequency of images.

Embodiment 19

The printed article of embodiment 17, wherein: the array of lenses has a frequency of lenses; the array of images has a frequency of images; and the frequency of lenses is less than the frequency of images.

Embodiment 20

The printed article of embodiment 17, wherein: the array of lenses has a frequency of lenses; the array of images has a frequency of images; and the frequency of lenses is the same as the frequency of images.

Embodiment 21

The printed article of embodiment 17, wherein the array of images comprises a micro-pattern image.

Embodiment 22

The printed article of any of embodiments 9-21, further comprising: (d) a second graphic image layer printed on at least one surface of the substrate.

Embodiment 23

The printed article of any of embodiments 9-22, wherein the substrate is transparent.

Embodiment 24

The printed article of embodiment 23, wherein the graphic image layer is printed on the bottom surface of the substrate.

Embodiment 25

A printed article comprising: (a) a substrate having a top surface and a bottom surface; (b) a graphic image layer comprising a plurality of images printed on at least one surface of the substrate; (c) a transparent layer formed on at least one surface of the substrate above the graphic image layer; and (d) a plurality of polygonal lenses formed on the transparent layer above the graphic image layer, wherein the polygonal lenses are clear, magnifying, convex lenses.

Embodiment 26

A printed article comprising: (a) a transparent substrate having a top surface and a bottom surface; (b) a graphic image layer comprising a plurality of images printed on the bottom surface of the substrate; and (c) a plurality of polygonal lenses printed on the top surface of the substrate, wherein the polygonal lenses are clear, magnifying, convex lenses.

Embodiment 27

A method of forming a printed article, the method comprising: (a) printing a graphic image layer comprising a plurality of images on at least one surface of a substrate; and (b)

printing a plurality of polygonal lenses on at least one surface of the substrate above the graphic image layer, wherein the polygonal lenses are clear, magnifying, convex lenses.

Embodiment 28

A printed article formed by the method of embodiment 27, wherein the polygonal lenses comprise hexagon lenses.

Embodiment 29

A method of forming a printed article, the method comprising: (a) printing a graphic image layer comprising a plurality of images on at least one surface of a substrate; (b) coating the graphic image layer with a transparent layer; and (c) forming a plurality of polygonal lenses on the transparent layer, wherein the polygonal lenses are clear, magnifying, convex lenses.

Embodiment 30

A printed article formed by the method of embodiment 29, wherein the polygonal lenses comprise hexagon lenses.

EXAMPLES

The following examples are illustrative and are not intended to limit the scope of the claimed subject matter.

Figure 1:
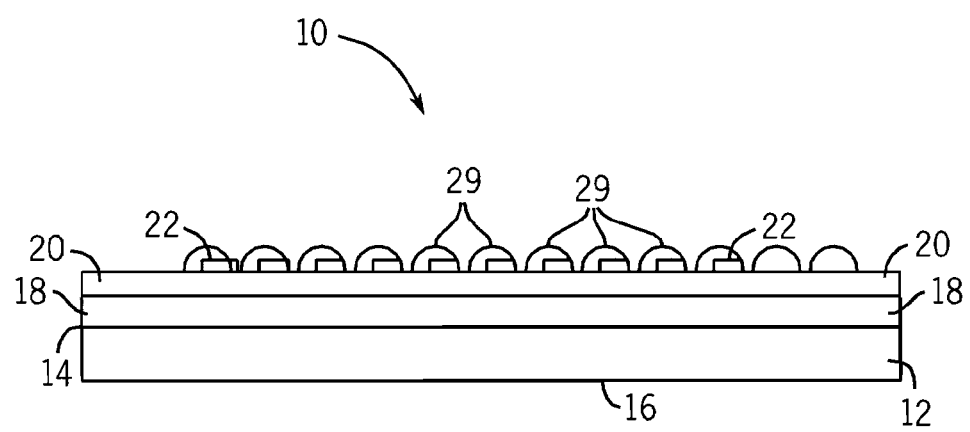
FIG. 1 is an enlarged cross-sectional view of one embodiment of a printed article produced in accordance with the present invention.

Referring now to FIG. 1, shown is a cross-sectional view of a first embodiment of a printed article 10 produced in accordance with the present invention and depicted on a much enlarged basis over typical size. In this embodiment, the printed article 10 includes a substrate 12 having a top surface 14 and a bottom surface 16. The substrate 12 can be formed of paper, cardboard, plastic, acrylic, glass, metal or any other suitable printable material. A layer 18 is preferably printed or laminated with a reflective ink over all or a portion of the top surface 14 of the substrate 12. While a reflective layer is preferred, it will be appreciated that the disclosed methods achieve great visual effects using even plain paper substrates. The layer 18 can be clear or have any color. The layer 18 can be opaque, transparent, semi-transparent or translucent. The layer 18 preferably gives the printed article a shiny or glossy metallic appearance. Alternatively, the reflective layer 18 can be formed of a chrome film, diffraction film, metallic foil, holographic foil, roll leafing, or any metallized material having a shiny surface.

A graphic design or image 20 is printed over all or a portion of layer 18. The graphic design may include a macro-image (e.g., a sports figure) and an array of images (e.g., a micro-pattern image 22). Subsequently, there is printed an array of transparent polygonal lenses 29 over layer 20. The frequency and placement of the lenses 29 is selected to magnify portions of the micro-pattern image in order to display a composite image that appears to float above the surface of the printed article.

The lenses 29 can be formed over the entire surface of the image 20 or over only a portion thereof. The lenses 29 may be formed from a transparent ink suitable for use in this application, printed on top of the graphic design or image 20 by a printing method such as silk screening, lithography, flexography, offset printing, gravure, coating or other known printing method. This transparent ink is preferably a UV-curable ink. The transparent ink may also include flakes of glitter, or pearls, or other materials to produce a "glittery" effect on the printed article.

In the preferred embodiment, the height of the transparent lenses 29 is approximately 0.0001 to 0.0010 inches, the spacing between the lenses is approximately 0.001 to 0.010 inches, and the lenses are hexagonal when viewed from a top planar perspective and 0.0001 to 0.010 inch in width as shown in a top planar view. The micro-pattern image is preferably comprised of a plurality of printed shapes of colors oriented in a frequency and direction such that each individual lenses 29 magnifies a portion of the micro-pattern image to create a composite image that appears to float above the surface of the printed article 10.

A preferred method of forming the graphic design 20 and micro-pattern image 22 is through an offset printing process. The graphic design 20 may be printed with opaque ink, semi-transparent ink, translucent ink, or any combination thereof. These inks are preferably curable in response to ultraviolet (UV) light. Other methods of forming the graphic design 20 and micro-pattern image 22 include silk screening, lithography, flexography, gravure or other known printing methods.

Figure 2:
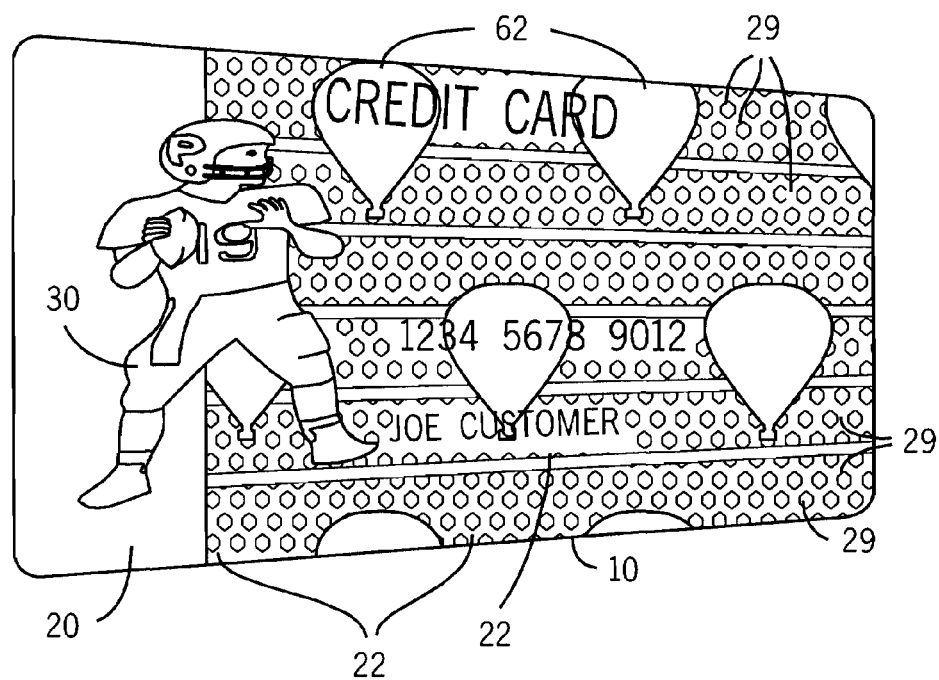
FIG. 2 is a 30 degree from a left side perspective of a top planar view of a secure credit card produced in accordance with the present invention.
Figure 3:
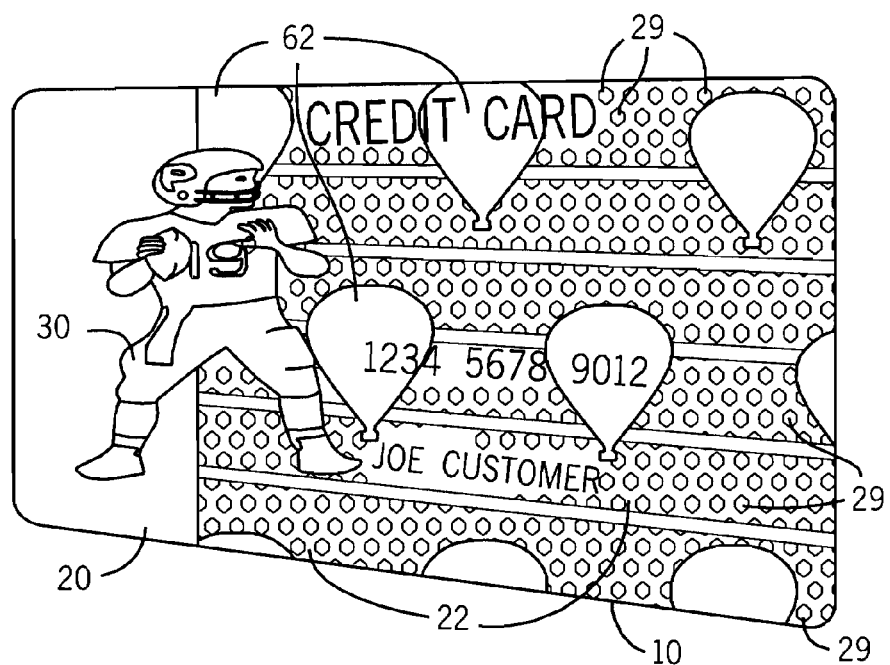
FIG. 3 is a 30 degree from a right side perspective of a top planar view of a secure credit card produced in accordance with the present invention.

FIG. 2 demonstrates the visual appearance of a printed article 10 when viewed from the left and FIG. 3 demonstrates the visual appearance when viewed from the right. A graphic design printed on the top surface of the article includes a sports FIG. 30. The plurality of polygonal lenses is represented by hexagonal lenses that are greatly exaggerated in size with respect to typical size in a printed article. The micro-pattern image 22 (micro image balloons in this example) is magnified by the hexagonal lenses to form composite images 62, represented by the balloons floating above the surface of the printed article 10. The micro-pattern image 22 (greatly exaggerated in size) is shown in a top planar view in FIG. 4.

As illustrated in FIG. 5, the orientation $\theta_1$ of the parallel rows of hexagonal lenses may be selected relative to the direction of observed errors in the production process to minimize and compensate for these errors. Examples of such errors are directions of printing, shear, squeegee movement, and anilox or gravure etching errors; film output errors; and digital raster image processing errors. The result of selecting the orientation on these bases may achieve higher texture height and close packing together of the hexagonal lenses. The spacing between hexagon lenses in this example is represented by 11 and the width of the hexagonal lenses represented by 12 of the transparent hexagonal lenses 29 in FIG. 5. The orientation and geometric shape of the transparent lenses may be selected to prevent flooding, bleeding, and/or undesirable flow of the lens, in this example, from one hexagon to the next.

Figure 6:
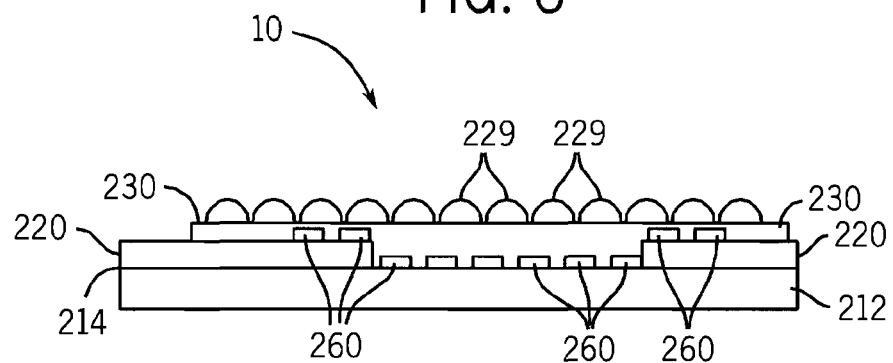
FIG. 6 is a cross-sectional view of a printed article according to another embodiment of the present invention having a transparent layer deposited over a micro-pattern image and under transparent lenses.

FIG. 6 demonstrates another embodiment of the present invention where a printed article 10 include a substrate 212 which may or may not be printed with a graphic image 220 onto surface 214. An array of images or a micro-pattern image 260 is also printed onto surface 214 and over a portion of the graphic image 220. A transparent layer 230 is applied partially or completely over the surface of graphic image 220 and micro-pattern image 260 and the transparent p lenses 229 are subsequently printed or formed over all or a portion of the surface of the transparent layer 230. The transparent layer 230 provides additional distance between the transparent lenses 229 and the micro-pattern image 260 and may increase the magnification effect.

Figure 7:
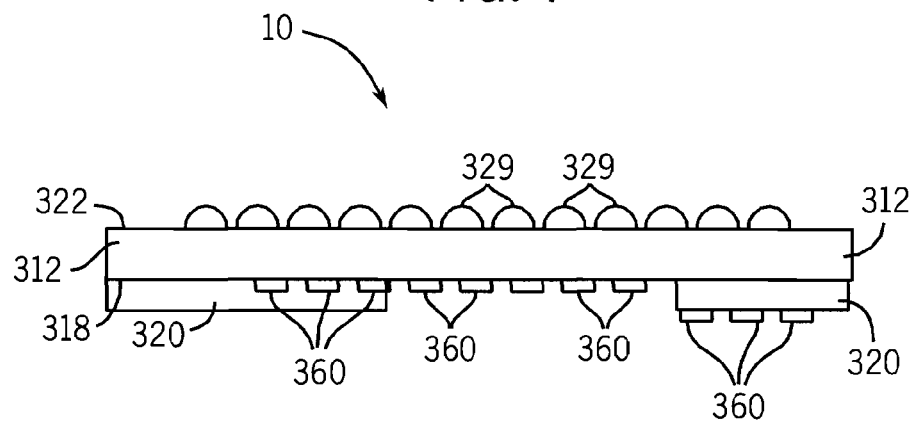
FIG. 7 is a cross-sectional view of a printed article according to another embodiment of the present invention where the micro-pattern image is printed on one surface of a transparent substrate and transparent lenses are printed on the opposite surface of the transparent substrate.

An additional embodiment is shown in FIG. 7 where a transparent substrate 312 may or may not be printed with a graphic image 320 onto surface 318. An array of images or a micro-pattern image 360 is also printed onto surface 318. The transparent lenses 329 are subsequently printed over all or a portion of the opposite surface 322 of the transparent substrate 312. The transparent substrate 312 provides additional distance between the transparent lenses 329 and the micropattern image 360 and may increase the magnification effect.

Figure 8:
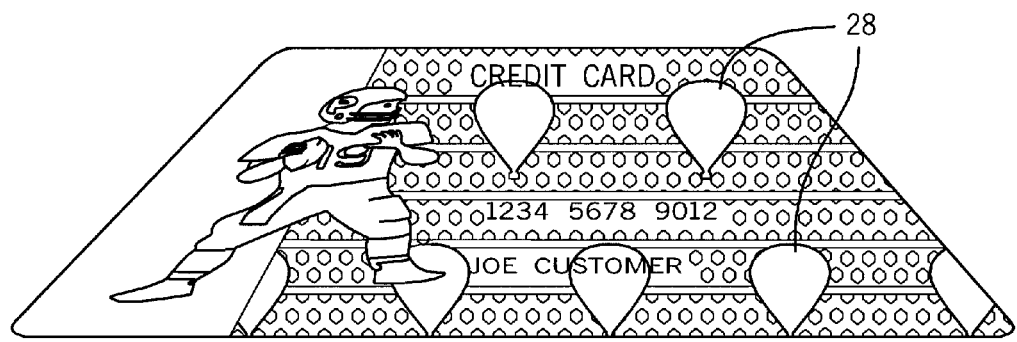
FIG. 8 is a top planar view of a printed article according to one embodiment of the present invention showing the appearance of a hidden image when viewed from an angle.
Figure 9:
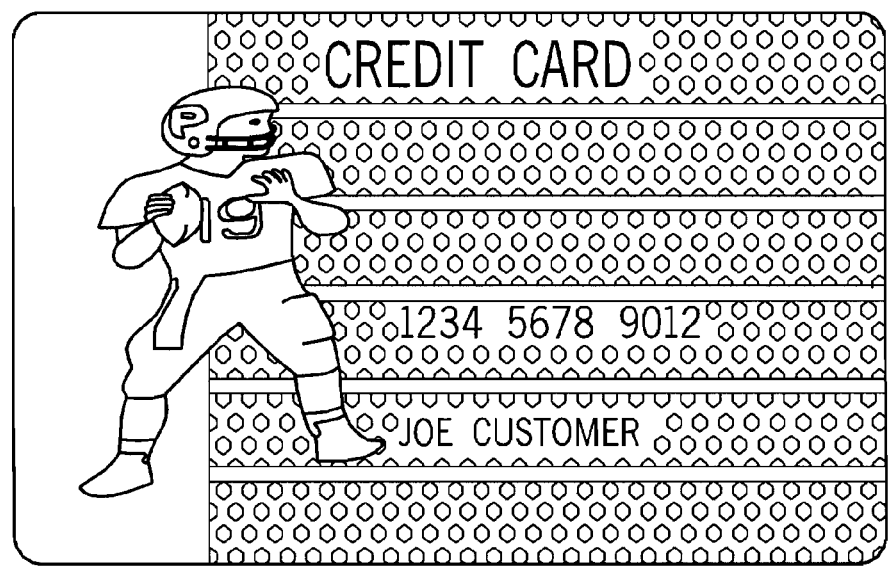
FIG. 9 is a top planar view of the article of FIG. 8 having a hidden image when viewed from a top angle.

The graphic design 20 can have any desired form, for example, a football player on a secure credit card as shown in FIG. 2, or any other image. The graphic design 20 may comprise a plurality of ink layers in order to provide a desired appearance. The graphic design 20 may also include a hidden or latent image 28 visible in FIG. 8 when viewed from a substantially non-planar view (as represented by floating balloons) and not visible in FIG. 9 when viewed in top planar perspective.

Figure 10:
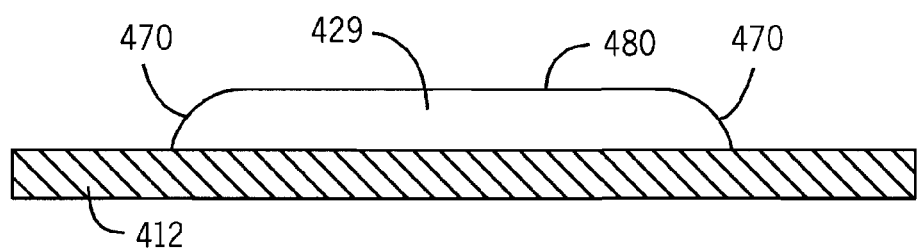
FIG. 10 is a cross-sectional view of another embodiment of the present invention showing the appearance of a substantially flat transparent lens.

In FIG. 10, the transparent lenses 429 are printed such that they are substantially flat 480 and semi-circular only on the periphery 470 of the lens when viewed in cross section.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible within the scope of the appended claims.

What is claimed is:

1. A printed article comprising:
   (a) a substrate having a top surface and a bottom surface;
   (b) a graphic image layer comprising a plurality of images printed on at least one surface of the substrate; and
   (c) a plurality of polygonal lenses printed on at least one surface of the substrate above the graphic image layer, wherein the polygonal lenses are clear, magnifying, convex lenses;
   wherein the printed lenses have a height of between 0.0001-0.001 inches, a width from a top planar view between 0.0001-0.01 inches, and spacing between the lenses is between 0.001 to 0.01 inches.

2. A printed article comprising:
   (a) a substrate having a top surface and a bottom surface;
   (b) a graphic image layer comprising a plurality of images printed on at least one surface of the substrate;
   (c) a transparent layer formed on at least one surface of the substrate above the graphic image layer; and
   (d) a plurality of polygonal lenses formed on the transparent layer above the graphic image layer, wherein the polygonal lenses are clear, magnifying, convex lenses;
   wherein the printed lenses have a height of between 0.0001-0.001 inches, a width from a top planar view between 0.0001-0.01 inches, and spacing between the lenses is between 0.001 to 0.01 inches.

3. A printed article comprising:
   (a) a transparent substrate having a top surface and a bottom surface;
   (b) a graphic image layer comprising a plurality of images printed on the bottom surface of the substrate; and
   (c) a plurality of polygonal lenses printed on the top surface of the substrate, wherein the polygonal lenses are clear, magnifying, convex lenses;
   wherein the printed lenses have a height of between 0.0001-0.001 inches, a width from a top planar view between 0.0001-0.01 inches, and spacing between the lenses is between 0.001 to 0.01 inches.

4. A method of forming a printed article, the method comprising:
   (a) printing a graphic image layer comprising a plurality of images on at least one surface of a substrate; and
   (b) printing a plurality of polygonal lenses on at least one surface of the substrate above the graphic image layer, wherein the polygonal lenses are clear, magnifying, convex lenses;
   wherein the printed lenses have a height of between 0.0001-0.001 inches, a width from a top planar view between 0.0001-0.01 inches, and spacing between the lenses is between 0.001 to 0.01 inches.

5. A method of forming a printed article, the method comprising:
   (a) printing a graphic image layer comprising a plurality of images on at least one surface of a substrate;
   (b) coating the graphic image layer with a transparent layer; and
   (c) forming a plurality of polygonal lenses on the transparent layer, wherein the polygonal lenses are clear, magnifying, convex lenses;
   wherein the printed lenses have a height of between 0.0001-0.001 inches, a width from a top planar view between 0.0001-0.01 inches, and spacing between the lenses is between 0.001 to 0.01 inches.

6. A method of forming a printed article, the method comprising:
   (a) printing a graphic image layer comprising a plurality of images on at least one surface of a substrate; and
   (b) printing a plurality of polygonal lenses on at least one surface of the substrate above the graphic image layer, wherein the polygonal lenses are clear, magnifying, convex lenses;
   wherein the printed lenses are arranged in parallel rows and the method further comprises adjusting orientation θ of the parallel rows to prevent flooding during printing of the lenses.

7. A method of forming a printed article, the method comprising:
   (a) printing a graphic image layer comprising a plurality of images on at least one surface of a substrate;
   (b) coating the graphic image layer with a transparent layer; and
   (c) forming a plurality of polygonal lenses on the transparent layer, wherein the polygonal lenses are clear, magnifying, convex lenses;
   wherein the printed lenses are arranged in parallel rows and the method further comprises adjusting orientation θ of the parallel rows to prevent flooding during printing of the lenses.

* * * * *